H. H. TIMKEN.
ROLLER BEARING.
APPLICATION FILED JUNE 29, 1918.

1,288,291.

Patented Dec. 17, 1918.

Inventor.
Henry H. Timken
by Cand Cann
his Attys.

UNITED STATES PATENT OFFICE.

HENRY H. TIMKEN, OF CANTON, OHIO.

ROLLER-BEARING.

1,288,291.      Specification of Letters Patent.      Patented Dec. 17, 1918.

Application filed June 29, 1918. Serial No. 242,607.

*To all whom it may concern:*

Be it known that I, HENRY H. TIMKEN, a citizen of the United States, and a resident of Canton, in the county of Stark and State of Ohio, have invented a new and useful Improvement in Roller-Bearings, of which the following is a specification.

My invention relates to conical roller bearings. A common type of conical roller bearing for vehicles comprises an inner bearing member or cone adapted to be mounted on a spindle or axle, an outer bearing member or cup adapted to fit a socket provided therefor in the hub of a wheel, and conical rollers between and coöperating with the bearing surfaces of said cone and cup. In order to properly take care of the end thrust, a bearing is mounted in each end of the hub of each wheel, and the cup of each bearing has its inner bearing surface coned at an inclination to its axis and with its conical surface tapering inwardly of the hub. The angle of repose for the outer surface of the cone and the socket in the hub of the wheel, for the metals ordinarily used, is less than the angle of inclination of the inner surface of said cup. Hence, if the exterior surface of the cup is parallel with the inner surface thereof, there will be a tendency for the cup to play back and forth endwise of the axle to the limited extent permitted by the locking devices. On the other hand, if the inclination of the exterior surface of the cup to the axis thereof is less than such angle of repose and a surface parallel with the axis, the tendency of the end thrust on the bearing will be to wedge the cup farther and farther into the socket in the hub, without any tendency on the part of the cup to loosen when the end thrust thereon is released. The present invention takes advantage of these conditions and consists mainly in forming the cup with its inner surface at such inclination as to meet the requirements thereof and with its exterior surface made at an inclination less than the angle of repose with relation to the hub socket.

Figure 1:
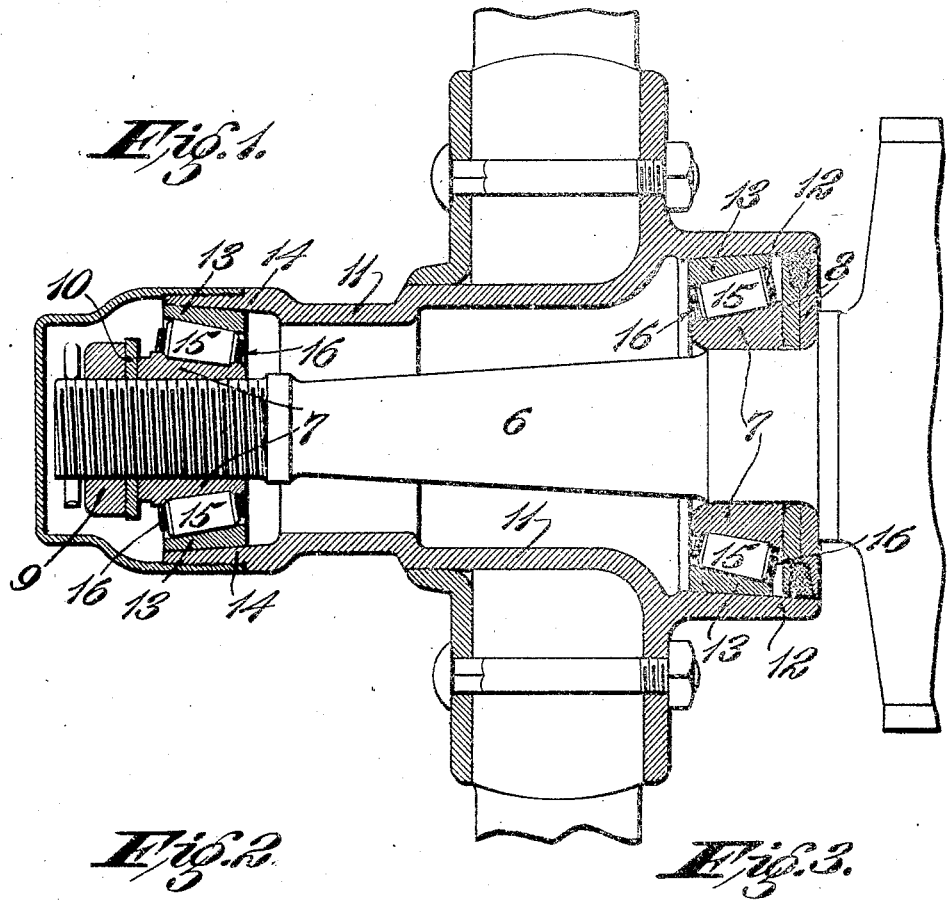
Figure 2:
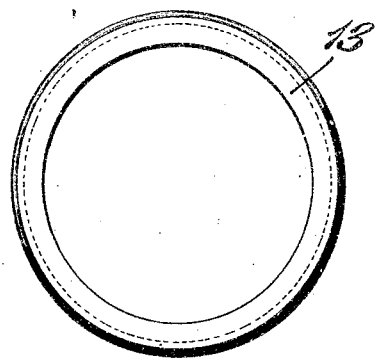
Figure 3:
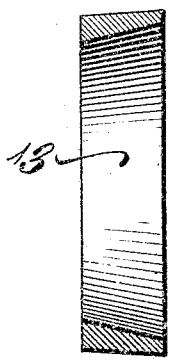

In the accompanying drawing which forms part of this specification, and wherein like reference numbers designate like parts wherever they occur, Figure 1 is a sectional view of the hub of a wheel equipped with my invention, Fig. 2 is an end view of the bearing cup;

Fig. 3 is a cross-section of the bearing cup.

Referring to the accompanying drawing, the spindle or end portion 6 of the axle is provided with two inner bearing members or cones 7 which are spaced apart and disposed with their smaller ends toward each other. In order to position the cone that lies toward the middle of the axle, said axle is provided with a shoulder between which and the end of said cone are suitable washers 8. The outer end of the spindle is threaded and provided with an adjusting nut 9 between which and the outer end of the outer bearing cone is disposed a washer 10. Other or additional adjusting and locking devices may be used.

The hub comprises a tubular body portion 11 having at its inner end an annular flange or socket 12 adapted to receive the cup 13 or outer bearing member and having at its outer end a socket 14 adapted to receive the cup 13 of the outer bearing. Between each cone 7 and its coöperating cup are the conical rollers 15 that are arranged in a circular series and are mounted in a suitable cage 16.

The inclination of the bearing surface of the cup is generally greater than the angle of repose for the contacting metals constituting the cup and the hub. This inclination depends on the character of the bearing used and is usually quite steep, averaging about three or four inches per foot. The inclination of the surfaces of contact between the cups and sockets is less than the angle of repose for the metals constituting those parts, being not less than one and one-half inches per foot of diameter taper.

The operation of the device is as follows: Assuming that there is an outward thrust on the axle, said thrust is transmitted through the cone at the inner end of the hub to the rollers in contact therewith and thence to the cup which it moves or tends to move farther into its socket. When this thrust is relieved, this cup at the inner end of the hub has no tendency to shift back to its initial position but stays at the point to which it has been forced. At the same time, the reversal of the stress has a similar effect in wedging inwardly the cup at the outer end of the hub which likewise remains at the point to which it is forced. The adjusting devices are then tightened to take up the unnecessary play. Thus, the full benefits of an accurate fit and adjustment of the parts are attained without the disadvantages resulting from binding or unnecessary play.

While I have described my invention as applied to the hub of a vehicle wheel, wherein the cones taper toward each other, it is obvious that the invention is capable of very general application. For instance, it is especially adaptable for use on the hubs of differential mechanism of automobile driving axles, in which relation the cups may be mounted in journal hangers having conical sockets and with either their large ends or their small ends facing each other. Obviously, also, the bearings may be used singly instead of in pairs.

What I claim is:

1. In a roller bearing construction, the combination with members having conical sockets of roller bearing cups fitting in said sockets, the inclination of the inner surface of said sockets to the axis thereof being less than the angle of repose for the contacting metals of said socket and bearing portions.

2. The combination with a tubular hub having conical sockets in its ends of roller bearings in said sockets, the inclination of the inner surface of said sockets being less than the angle of repose for the contacting metals of said socket and bearing portions.

3. A hub having a conical socket therein and a conical roller bearing in said socket, the inclination of said socket to its axis being less than the angle of repose for the metal in contact therewith.

4. The combination of an axle having conical roller bearings spaced apart but tapering toward each other on the ends of said axle, and wheels having hubs with sockets in their ends to receive said bearings, the inclination of the outer surface of the cups of said bearings being less than the angle of repose and the inclination of the inner surface being considerably greater than the angle of repose.

5. A hub having a conical steel socket and a cup for a conical roller bearing fitting in said socket, the inclination of the outer surface of said cup being less than one and one-half inches per foot, and the inclination of the inner surface thereof being greater than three inches per foot.

Signed at Canton, Ohio, this 25th day of June, 1918.

HENRY H. TIMKEN.